United States Patent
Chinthalapudi et al.

(10) Patent No.: US 9,918,254 B2
(45) Date of Patent: Mar. 13, 2018

(54) SYSTEM AND METHOD FOR PREVENTING VOICE CALL (VOLTE) DROPS IN A COMMUNICATION NETWORK

(71) Applicant: Samsung Electronics Co., Ltd., Gyeonggi-do (KR)

(72) Inventors: Srinivas Chinthalapudi, Bangalore (IN); Ajay Kumar Kabadi, Bangalore (IN); Prasad Basavaraj Dandra, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/954,354

(22) Filed: Nov. 30, 2015

(65) Prior Publication Data
US 2016/0262061 A1 Sep. 8, 2016

(30) Foreign Application Priority Data
Mar. 2, 2015 (IN) .............................. 998/CHE/2015

(51) Int. Cl.
*H04W 36/00* (2009.01)
*H04L 29/06* (2006.01)

(52) U.S. Cl.
CPC ..... *H04W 36/0022* (2013.01); *H04L 65/1016* (2013.01); *H04L 65/1059* (2013.01); *H04L 65/1069* (2013.01)

(58) Field of Classification Search
CPC ........... H04W 36/0022; H04L 65/1059; H04L 65/1016; H04L 65/1069
See application file for complete search history.

(56) References Cited

U.S. PATENT DOCUMENTS

| 2011/0090848 A1* | 4/2011 | Kim ...................... H04W 60/00 370/328 |
| 2013/0286936 A1* | 10/2013 | Sen ........................ H04W 60/00 370/328 |
| 2015/0117401 A1* | 4/2015 | Jiang ................. H04W 36/0022 370/331 |
| 2016/0021579 A1* | 1/2016 | Mufti ................ H04W 36/0022 370/331 |
| 2016/0057661 A1* | 2/2016 | Nayak ............... H04W 36/0022 370/331 |
| 2016/0066218 A1* | 3/2016 | Basavarajappa .. H04W 36/0022 370/331 |

FOREIGN PATENT DOCUMENTS

| JP | 2014022890 | 2/2014 |
| KR | 1020140047975 | 4/2014 |
| WO | WO 2012/135994 | 10/2012 |
| WO | WO 2013/183316 | 12/2013 |

* cited by examiner

*Primary Examiner* — Mohammad Anwar
(74) *Attorney, Agent, or Firm* — The Farrell Law Firm, P.C.

(57) ABSTRACT

Disclosed is a system, User Equipment (UE) and method for preventing voice call (VoLTE) call drops in a communication network. A paging message is received as an Internet Protocol Multimedia Subsystem (IMS) invite message. The paging message includes a domain, or the UE establishes a connection with the network, in order to determine whether the IMS invite is for a voice call. A condition of non-sustenance of the voice call is detected based on a power level check for the UE and Extended Service Request (ESR) is triggered. The voice call is continued according to a success or a failure of the ESR.

16 Claims, 10 Drawing Sheets

US 9,918,254 B2

SYSTEM AND METHOD FOR PREVENTING VOICE CALL (VOLTE) DROPS IN A COMMUNICATION NETWORK

PRIORITY

This application claims priority under 35 U.S.C. § 119(a) to an Indian patent application filed in the Indian Patent Office on Mar. 2, 2015 and assigned Serial No. 998/CHE/2015, the contents of which are incorporated herein by reference.

BACKGROUND

1. Field of the Disclosure

The present disclosure relates generally to prevention of voice call drops, and more particularly, to a system and method for preventing Voice over Long Term Evolution (VoLTE) call drops in a communication network.

2. Description of the Related Art

VoLTE has provided several advantages for mobile users, such as improved voice quality and faster video and messaging connectivity. VoLTE is supported by $4^{th}$ Generation (4G) data network technology and may not be activated on $2^{rd}$ Generation (2G) or $3^{rd}$ Generation (3G) networks.

There are instances in VoLTE, however, when a call drops due to a UE (UE) receiving an Internet Protocol Multimedia Subsystem (IMS) call in low signal conditions. The call may be dropped just after getting connected or may not be sustainable until Single Radio Voice Call Continuity (SRVCC) is performed. The call drop may also be unavoidable when a network and the UE do not support SRVCC. Furthermore, available legacy 2G/3G networks may not be used unless several call attempts are made by the mobile user.

Another challenge is the deployment of network entities for supporting SRVCC that would inevitably result in a cost increase for matching an entire geographic range with respect to subscriber service commitments.

Accordingly, there is a need in the art to provide a system and method for preventing VoLTE call drops in a communication network.

The above information is presented as background information only to help the reader to understand the present disclosure. Applicants have made no determination and make no assertion as to whether any of the above might be applicable as Prior Art with regard to the present application.

SUMMARY

Embodiments of the present disclosure have been made to address at least the above problems and/or disadvantages and to provide at least the advantages described below. Accordingly, an aspect of the present disclosure provides a method and system preventing voice call drops.

Another aspect of the present disclosure is to provide a detection of a condition of non-sustenance of the voice call based on a power level check of a User Equipment (hereinafter, UE).

Another aspect of the present disclosure is to send a paging message to the UE with a new voice call domain.

Another aspect of the present disclosure is to trigger an Extended Service Request (ESR) for switching the voice call from Internet Protocol Multimedia Subsystem (IMS) to Circuit Switched Feedback (CSFB) when the power level of the UE is weak.

Another aspect of the present disclosure is to continue the voice call based on the ESR, thereby preventing a voice call drop.

BRIEF DESCRIPTION OF THE DRAWINGS

The above and other aspects, features, and advantages will be more apparent from the following description when taken in conjunction with accompanying drawings in which.

DETAILED DESCRIPTION OF EMBODIMENTS OF THE DISCLOSURE

Figure 1:
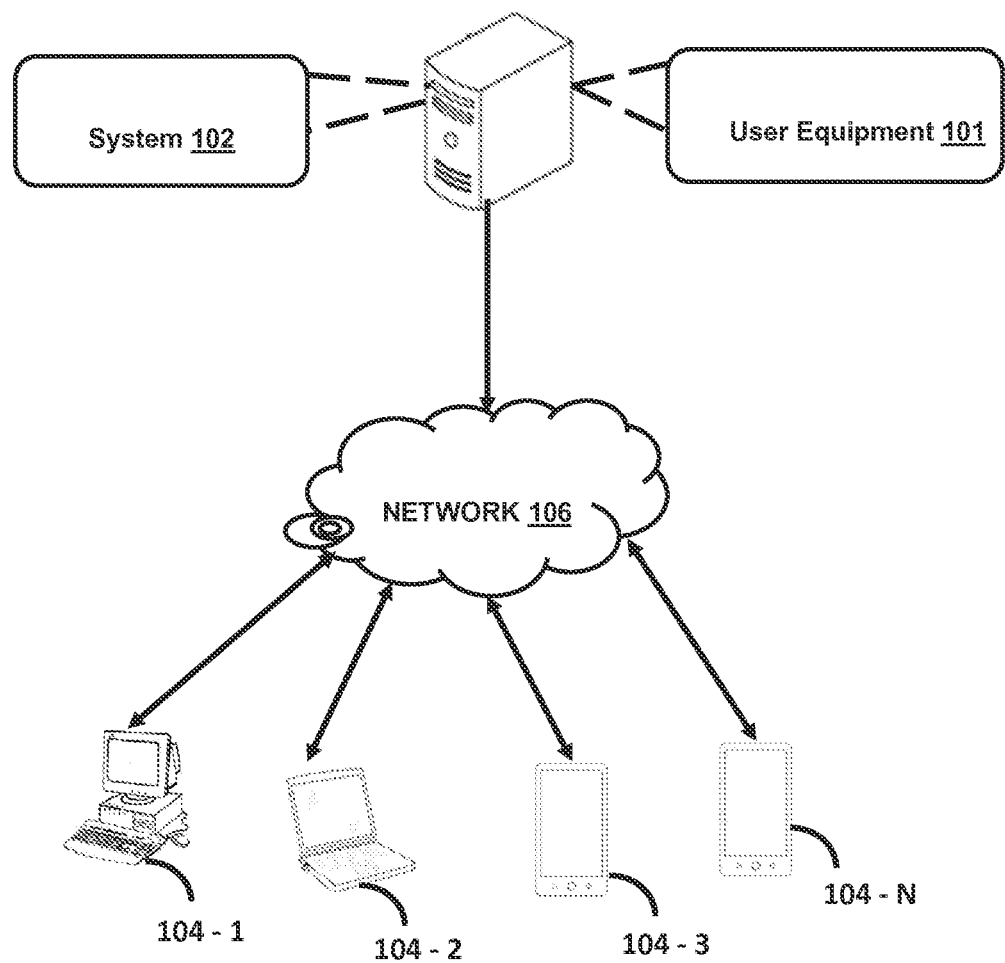
FIG. 1 illustrates a network implementation of a system and UE for prevention of a voice call drop in a communication network, according to embodiments of the present disclosure.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, reference may be made to "an", "one", or "some" embodiment(s). This does not necessarily imply that each such reference is to the same embodiment(s), or that the feature only applies to a single embodiment. Single features of different embodiments may also be combined to provide other embodiments.

As used herein, the singular forms "a", "an", and "the" are intended to include the plural forms as well, unless expressly stated otherwise. It will be further understood that the terms "includes", "comprises", "including", and/or "comprising", when used herein, specify the presence of stated features, integers, steps, operations, elements, and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

According to the present disclosure, a method for configuring a UE for preventing voice call drop includes receiving a paging message as an IMS invite message from a network, establishing a connection with the network to determine whether the IMS invite message is for a voice call, detecting a condition of non-sustenance of the voice call based on a power level check for the UE, triggering an ESR for switching the voice call from the IMS to CSFB based on the non-sustenance detection, and continuing the voice call, on the UE, based on the ESR.

According to the present disclosure, a method for preventing voice call drops at a UE includes transmitting, to the UE, a paging message as an IMS invite message from a network, wherein the IMS invite message is for a voice call, receiving, from the UE, an ESR trigger, wherein the ESR trigger is associated with a message to switch the voice call from the IMS to CSFB, and is received when the UE is detected with a condition of non-sustenance of the voice call, and continuing the voice call, on the UE, according to a a success of the ESR or a failure of the ESR.

According to the present disclosure, a method for configuring a UE for preventing voice call drops includes receiving a paging message as an IMS invite message, wherein the paging message is associated with a domain that indicates that the paging message is for a voice call, detecting a condition of non-sustenance of the voice call based on a power level check for the UE, triggering an ESR for switching the voice call from the IMS to CSFB based on the detection of non-sustenance, and continuing the voice call, on the UE, based on the ESR.

According to the present disclosure, a UE for preventing voice call drops includes a chip set, a memory coupled to the chip set, wherein the memory stores a plurality of modules executed by the chip set, and wherein the plurality of modules comprises a reception module configured to receive a paging message as an IMS invite message from a network, a connection establishment module configured to establish a connection with the network to determine whether the IMS invite message is for a voice call, a detection module configured to detect a condition of non-sustenance of the voice call based on a power level check for the UE, a trigger module configured to trigger an ESR for switching the voice call from the IMS to CSFB based on the detection of non-sustenance, and a continuation module configured to continue the voice call, on the UE, based on the ESR.

According to the present disclosure, a system for preventing voice call drops at a UE comprises a chip set, a memory coupled to the chip set, wherein the memory stores a plurality of modules executed by the chip set, and wherein the plurality of modules comprises a transmission module configured to transmit, to the UE, a paging message as a result of an IMS invite message from a network, wherein the IMS invite message is for a voice call, a reception module configured to receive, from the UE, an ESR trigger, wherein the ESR trigger is associated with a message to switch the voice call from the IMS to CSFB, wherein the ESR trigger is received when the UE detected with a condition of non-sustenance of the voice call, and a continuation module configured to continue the voice call, on the UE, based on the ESR.

According to the present disclosure, a UE for preventing voice call drops includes a chip set, a memory coupled to the chip set, wherein the memory stores a plurality of modules executed by the chip set, and wherein the plurality of modules comprises a reception module configured to receive a paging message as an IMS invite message, wherein the paging message is associated with a domain to indicate that the paging message is for a voice call, a detection module configured to detect a condition of non-sustenance of the voice call based on a power level check for the UE, a trigger module configured to trigger an ESR for switching the voice call from the IMS CSFB based on detection, and a continuation module configured to continue the voice call, on the UE, based on the ESR.

According to the present disclosure, a Non-transitory Computer Readable Storage Medium (CRM) is disclosed having recorded thereon a computer program for executing a method for configuring a UE for preventing voice call drops, the method comprising receiving a paging message as an IMS invite message from a network, establishing a connection with the network to determine whether the IMS invite message is for a voice call, detecting a condition of non-sustenance of the voice call based on a power level check for the UE, triggering an ESR for switching the voice call from the IMS to CSFB based on the non-sustenance detection, and continuing the voice call, on the UE, based on the ESR.

According to the present disclosure, a Non-transitory CRM is disclosed having recorded thereon a computer program for executing a method for preventing voice call drops at a UE, the method comprising transmitting, to the UE, a paging message as an IMS invite message from a network, wherein the IMS invite message is for a voice call, receiving, from the UE, an ESR trigger, wherein the ESR trigger is associated with a message to switch the voice call from the IMS to CSFB, and is received when the UE is detected with a condition of non-sustenance of the voice call, and continuing the voice call, on the UE, according to a success of the ESR or a failure of the ESR.

According to the present disclosure, a Non-transitory CRM is disclosed having recorded thereon a computer program for executing a method for preventing voice call drops, the method comprising receiving a paging message as an IMS invite message, wherein the paging message is associated with a domain that indicates that the paging message is for a voice call, detecting a condition of non-sustenance of the voice call based on a power level check for the UE, triggering an ESR for switching the voice call from the IMS to CSFB based on the detection of non-sustenance, and continuing the voice call, on the UE, based on the ESR.

FIG. 1 illustrates a network implementation 100 of a system and UE for prevention of a voice call drop in a communication network, according to embodiments of the present disclosure.

Although FIG. 1 is described considering the UE 101 and the system 300 implemented as an application (to execute a set of instructions) on a server, the UE 101 and the system 300 may also be implemented in a variety of computing systems, such as a laptop computer, a desktop computer, a notebook, a workstation, a server, a network server, and an electronic device. In one implementation, the system 300 may be implemented in a cloud-based environment. Multiple users may access the system 300 through one or more user devices 104-1, 104-2 . . . 104-N, hereinafter collectively referred to as user devices 104, or applications residing on the user devices 104. Examples of the user devices 104 include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as Intranet, Local Area Network (LAN), Wide Area Network (WAN), and the Internet.

Figure 2:
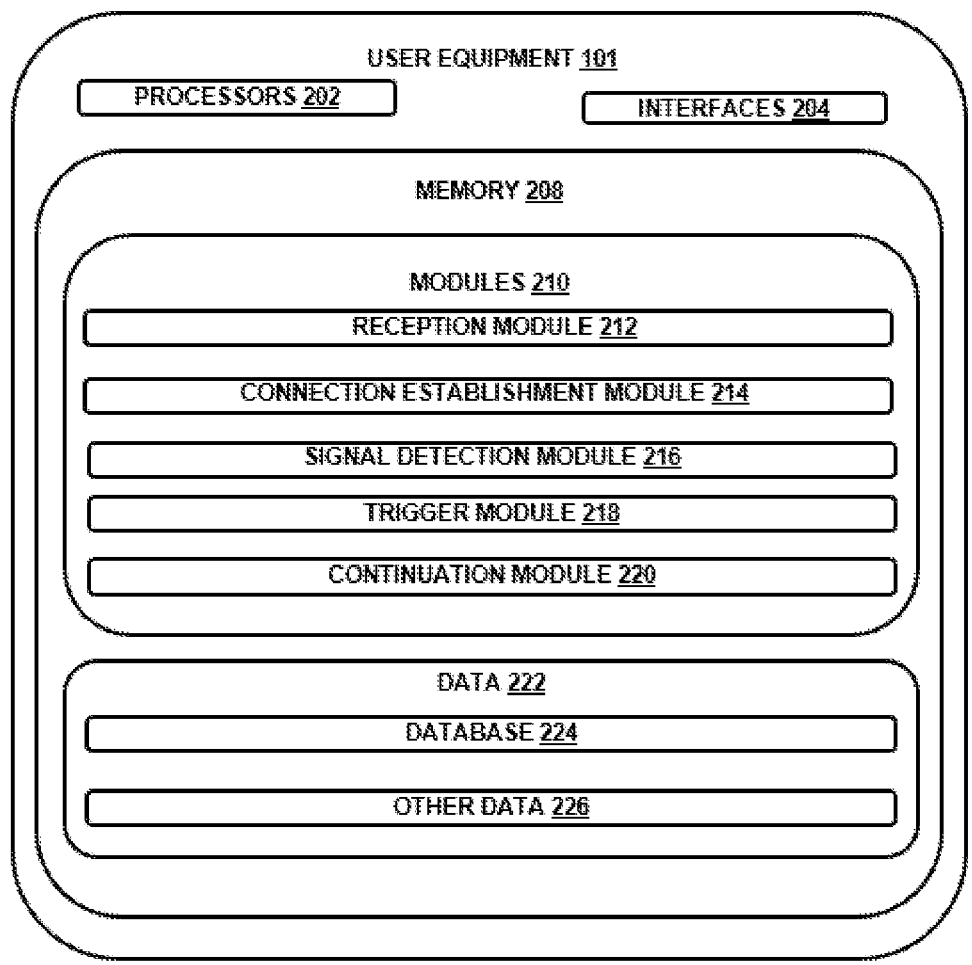
FIG. 2 illustrates details of modules in a UE for prevention of a voice call drop in a communication network, according to embodiments of the present disclosure.

FIG. 2 illustrates details of modules in a UE for prevention of a voice call drop in a communication network, according to embodiments of the present disclosure.

Referring to FIG. 2, the UE 101 includes at least one processor 202, an Input/Output (I/O) interface 204 (herein a configurable user interface), and a memory 208. The at least one processor 202 may be implemented as one or more microprocessors, microcomputers, microcontrollers, digital signal processors, central processors, state machines, logic circuitries, and/or any devices that manipulate signals based on operational instructions. Among other capabilities, the at least one processor 202 is configured to fetch and execute computer-readable instructions stored in the memory 208.

The I/O interface 204 includes a variety of hardware and software interfaces, such as a web interface and a graphical user interface. The I/O interface 204 enables the UE 101 to interact with a user directly or through the client devices 104, and to communicate with other computing devices, such as web servers and external data servers (not shown). The I/O interface 204 facilitates multiple communications within a wide variety of networks and protocol types, including wired networks such as LAN and cable, and wireless networks such as WLAN, cellular, and satellite. The I/O interface 204 includes one or more ports for interconnecting a number of devices or connecting the devices to another server.

The modules 210 include, for example, routines, programs, objects, components, and data structures which perform particular tasks and functions or implement particular abstract data types. In FIG. 2, the modules 210 include a reception module 212, a connection establishment module 214, a signal detection module 216, a trigger module 218, and a continuation module 220. The modules 210 also include programs or coded instructions that supplement applications and functions of the UE 101. The modules 210 may further include a buffer module (not shown).

The data 222, amongst other things, serves as a repository for storing data processed, received, and generated by one or more of the modules 210. The data 222 includes a database 224, and other data 226 such as data generated as a result of the execution of one or more modules 210.

The reception module 212 of the UE 101 receives a paging message as a result of an IMS invite message. Specifically, the connection detection module 214 sets up or establishes the connection with the network 106, and the UE 101 then reads the IMS invite message to determine whether the paging message is for the voice call or not.

When the UE 101 determines that the IMS invite message is for the voice call, the signal detection module 216 detects a condition of non-sustenance based on a power level check for the UE 101. The signal detection module 216 detects the power levels of serving and neighbor cells on which the UE 101 is registered. If the condition of non-sustenance is detected, i.e. the signal detection module 216 of the UE 101 finds that the power levels of the UE 101 may not sustain the voice call, the trigger module 218 triggers an Extended Service Request (ESR) to the network 106 with a field indicating a switch of the voice call from IMS to CSFB. In an embodiment, reserved bits for service type may be used to indicate the switch of the voice call information in the ESR message to Mobility Management Entity (MME) and Mobile Switching Center (MSC).

The continuation module 220 continues the voice call on the UE 101 as per the ESR, thus preventing voice call drop. The continuation module 220 continues the voice call on the UE 101 based on at least one of a success and a failure of the ESR.

In an embodiment, the continuation module 220 continues the voice call in a Circuit Switched (CS) domain on a 2G/3G legacy network by terminating reception of IMS signal procedures when the voice call is switched from the IMS to the CSFB.

In an embodiment, the UE 101 is further configured to prevent voice call drop by receiving the IMS message as the paging message with a new, additional domain called a voice call domain. The new domain to the paging message prevents the UE 101 from establishing a connection with the network for determining whether the IMS message invite is the voice call. The UE 101 then triggers the ESR and the voice call is continued based on the success or failure of the ESR as described above.

Figure 3:
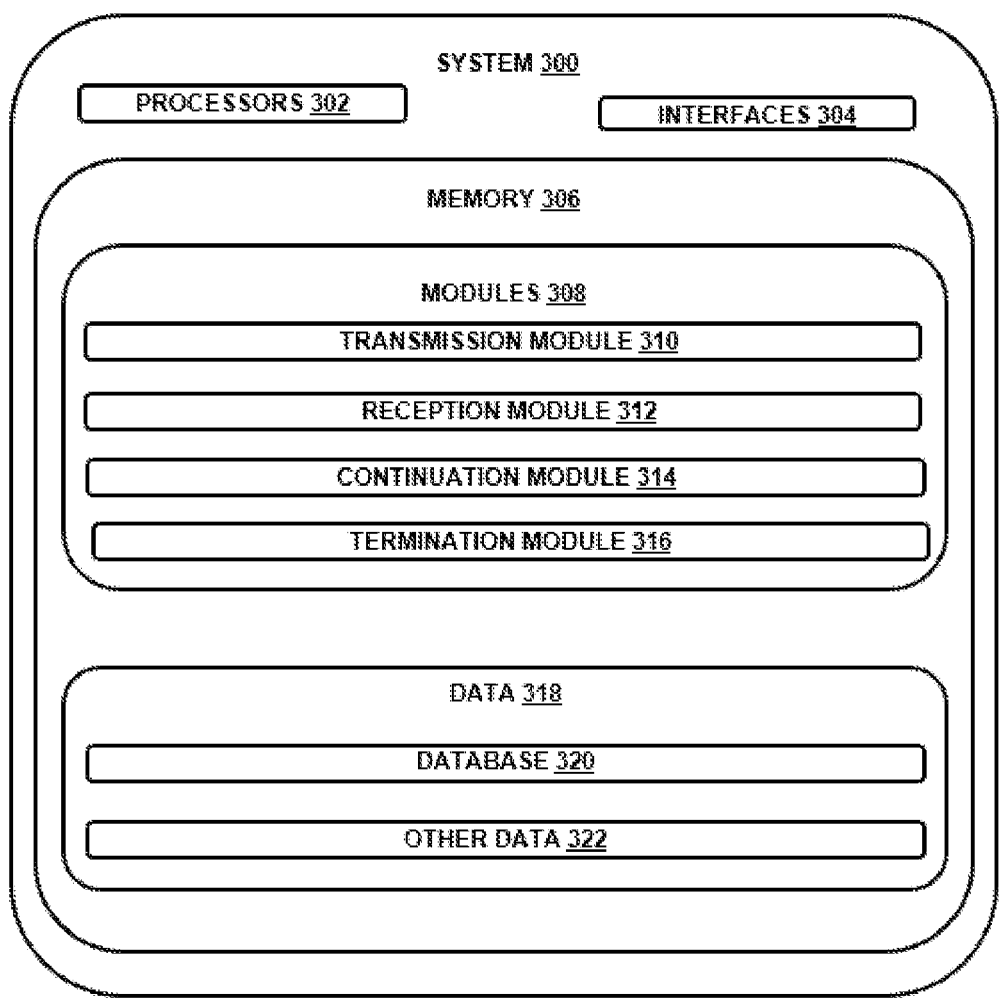
FIG. 3 illustrates details of modules in a system for prevention of a voice call drop in a communication network, according to embodiments of the present disclosure.

FIG. 3 illustrates details of modules in a system for prevention of a voice call drop in a communication network, according to embodiments of the present disclosure.

Referring to FIG. 3, a system 300 for preventing voice call drops at UE, such as UE 101 in FIG. 1, includes at least one processor 302 and interface 304, as well as a memory 306 that stores modules 308 to be executed by the processor 302. The modules 308 comprise a transmission module 310, a reception module 312, a call continuation module 314, and a termination module 316. The system 300 further comprises data 318, a database 320 and other data 322, similar to the above description for UE 101.

The transmission module 310 of the system 300 transmits an IMS invite message as a paging message, i.e., for a voice call, to the UE 101 based on a trigger by the UE 101 for receiving the IMS invite message. The transmission module may transmit the paging message with or without the new domain directly identifying the IMS invite message for the voice call.

The reception module 312 receives an ESR from the UE 101 based on detection of a condition of non-sustenance of voice call at the UE 101. The condition of non-sustenance is detected by performing a power check for the UE 101.

The reception module 312 receives the ESR associated with a field indicating to switch the voice call from IMS to CSFB. Reserved bits for service type may be used to indicate information regarding switching of the voice call to MME and MSC due to the condition of non-sustenance. The 3$^{rd}$ Generation Partnership Project (3GPP) specification, 24.301 defines the service type value of size 1 octet, and 0000-1011 may be used for values after the values are reserved for further use.

The continuation module 316 continues the voice call based upon at least one of a success of ESR (ESR success scenario) or a failure of ESR (ESR failure scenario).

In the ESR success scenario, the continuation module 312 of the system 300 is configured to check a service type and continue the call through CSFB. MME may indicate a new service type to the MSC, which further indicates the call switch from IMS to CSFB to a network entity Telecommunication Application Server (TAS).

The termination module 318 is configured to terminate the IMS signaling procedures so that the continuation module 316 continues the voice call of the UE 101 in a CS domain of a legacy 2G/3G network. The voice call switching may be indicated through the Sv interface, and message type value from the reserved bits for the Sv interface (245-247) may be used.

The Sv interface may be used to support Inter-RAT handover from IMS-based voice service over Evolved Packet System (EPS) to the CS domain over 3GPP Universal Terrestrial Radio Access Network/Global System for Mobile Communications EDGE Radio Access Network (UTRAN/GERAN) access or from UTRAN (High Speed Packet Access) to 3GPP UTRAN/GERAN access, and to support Inter-Radio Access Technologies (Inter-RAT) handover from IMS-based voice and video service over EPS to the CS domain over 3GPP UTRAN access. The Sv interface is also used to support Inter-RAT handover from voice service in the CS domain over 3GPP UTRAN/GERAN access to IMS-based service over LTE or UTRAN (HSPA).

In an embodiment, once the IMS signaling procedures are terminated by the termination module 316, the IMS server may send a Session Initiation Protocol (SIP) cancel method to cancel IMS invite messages to the UE 101. The SIP cancel method involves one or more procedures to cancel the IMS voice call and related context in UE 101 and network 106.

In the ESR failure scenario, the continuation module 312 of the system 300 moves to at least one of the 2G or 3G legacy network in order to find a legacy cell, based on one or more parameters including measurement and reselection of/to legacy network, stored neighbor information, and a Public Land Mobile Network (PLMN) search. The MSC may receive an indication from the UE 101 regarding the switch of the voice call from the IMS to CSFB through a 3rd or 4th space octet of additional update parameters in a Location Area Update (LAU) request (if a Local Area ID (LAI) is different or unknown) or in a paging response received from the UE 101. The MSC may also indicate the switching of the voice call from the IMS to CSFB to the network entity TAS.

Upon indication from the MSC, the termination module 316 terminates all the IMS signaling procedures and the continuation module 314 continues the voice call in the CS domain on the 2G/3G legacy network. The voice call switch is indicated on the Sv interface and message type value reserved from reserved bits for Sy interface (245-247) may be used.

In another embodiment, the system 300 may further transmit the IMS invite as the paging message (i.e., a voice call) by adding a domain to the paging message. The addition of the domain precludes a requirement for the UE 101 to connect to the network in order to identify the IMS call invite as the voice call invite.

Figure 4:
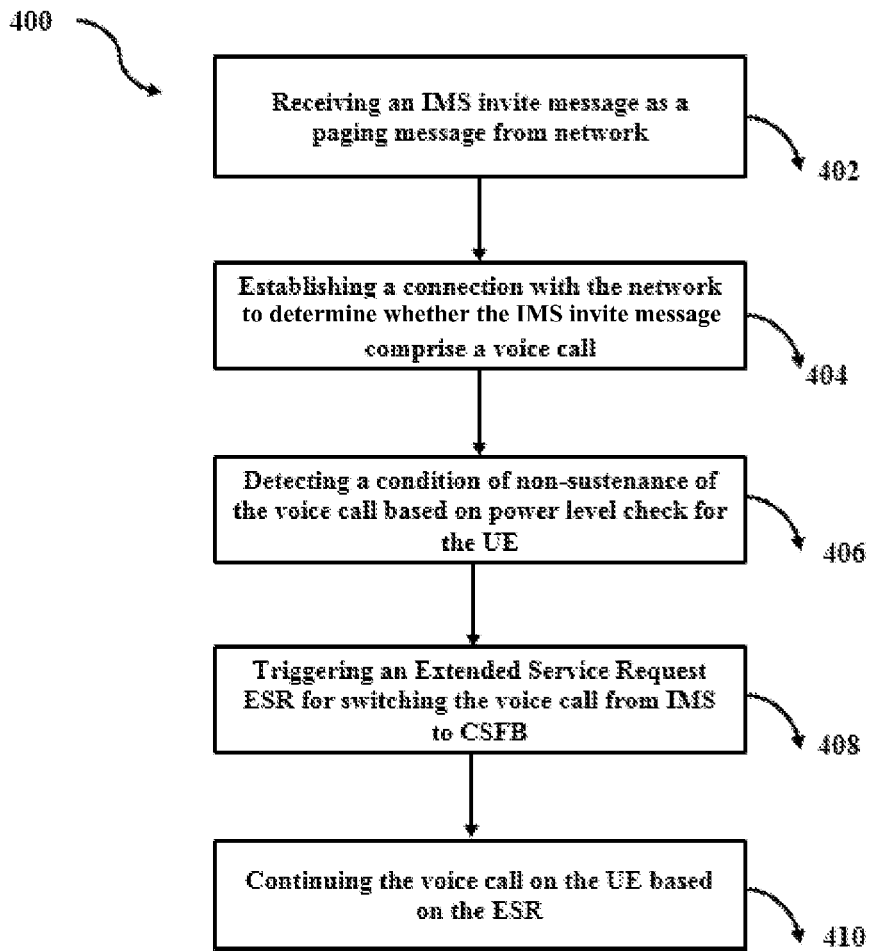
FIG. 4 illustrates a flow chart of a method for configuring a UE to prevent a voice call drop in a communication network, according to embodiments of the present disclosure.

FIG. 4 illustrates a flow chart of a method for configuring a UE to prevent a voice call drop in a communication network, according to embodiments of the present disclosure. The method 400 may be performed by the UE 101.

In step 402, the UE 101 receives a paging message as an Internet Protocol Multimedia IMS invite message from a network. The reception module 212 of the UE 101 may receive the IMS invite message.

In step 404, the UE 101 establishes a connection with the network to determine whether the IMS invite message is for a voice call. The connection establishment module 214 of the UE 101 may establish the connection with the network.

In step 406, the UE 101 detects a condition of non-sustenance of the voice call based on a power level check of the UE. The signal detection module 216 of the UE 101 may detect the condition of non-sustenance.

In step 408, the UE 101 triggers an ESR for switching the voice call from the IMS to CSFB based on non-sustenance condition detection. The trigger module 218 of the UE 101 may trigger the ESR for switching the voice call.

In step 410, the UE 101 continues the voice call, based on the ESR. The continuation module 220 of the UE 101 may continue the voice call.

Figure 5A:
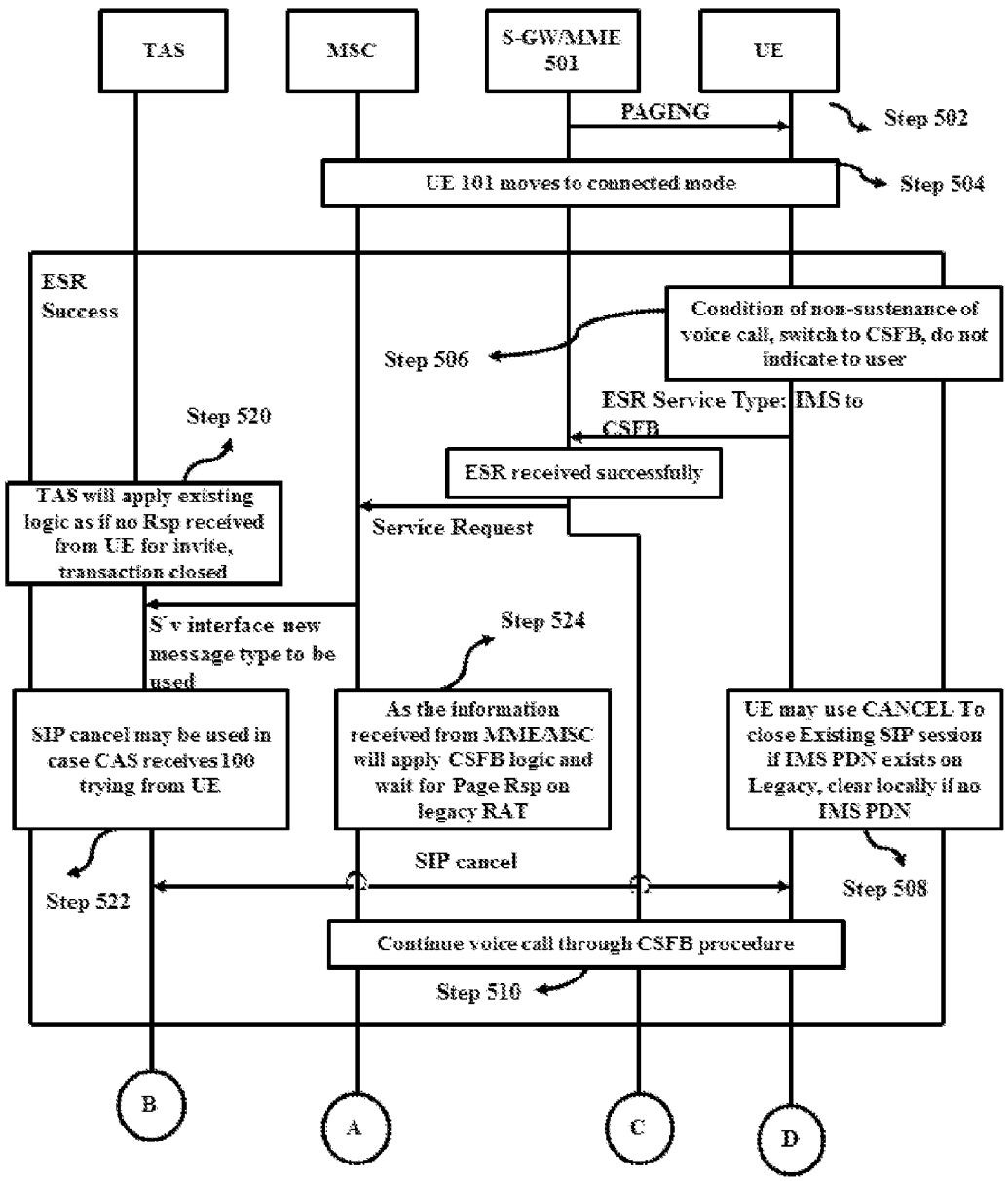
FIGS. 5a and 5b illustrate a method for preventing a voice call drop in a communication network without a paging type, according to embodiments of the present disclosure.
Figure 5B:
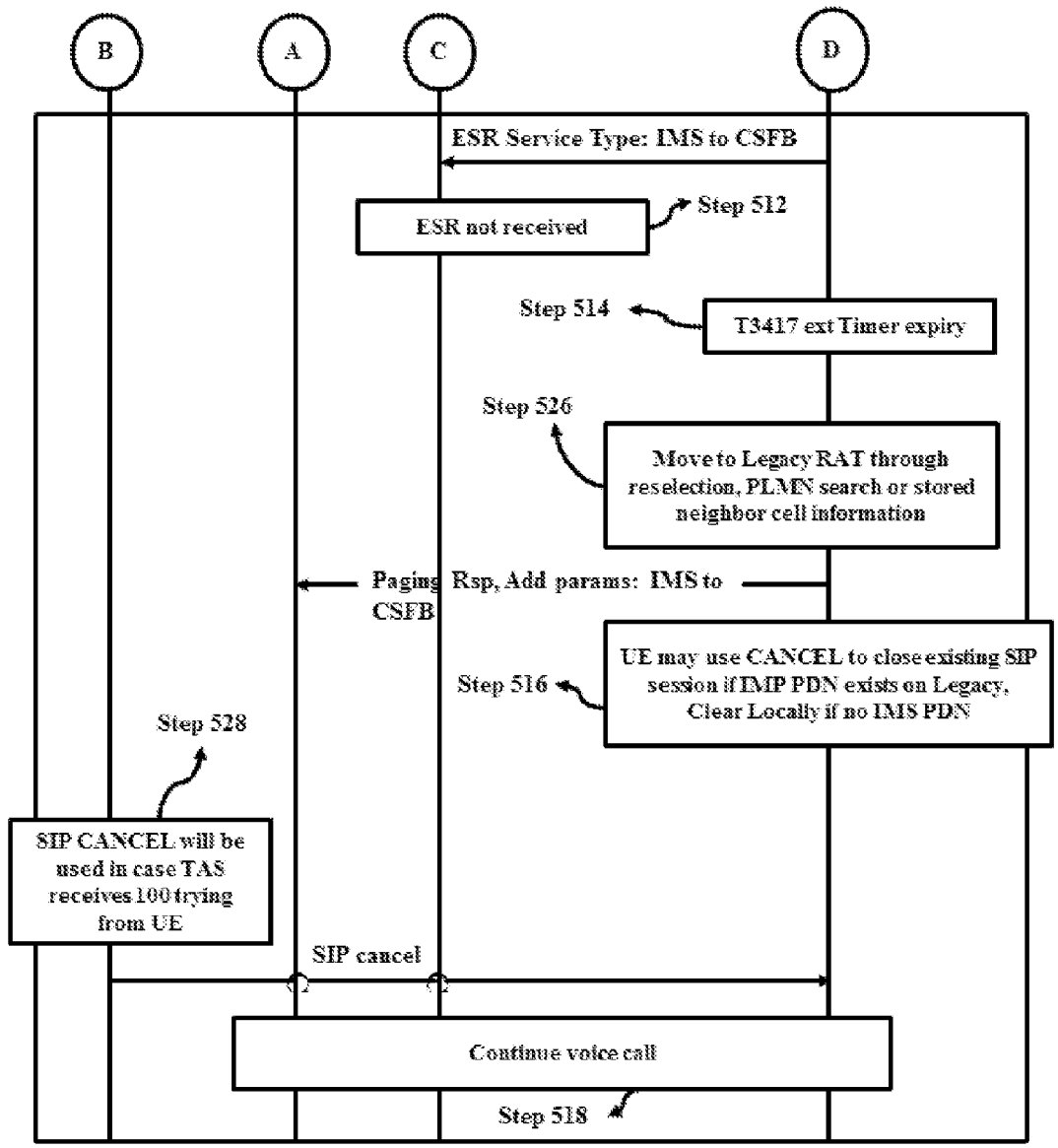

FIGS. 5a and 5b illustrate a method for preventing a voice call drop in a communication network without a paging type, according to embodiments of the present disclosure.

Referring to FIGS. 5a and 5b, at step 502, the paging message is received by the UE 101 from a Serving Gateway Mobility Management Entity (S-GW/MME) 501. The UE 101 moves to a connected mode to determine whether the paging message is the voice call in step 504. The connection is established by the connection establishment module 214 of the UE 101. In step 506, the condition of non-sustenance is detected and the ESR is triggered, without the user being notified.

In step 508, after the ESR is triggered in the ESR success scenario when the ESR is received, the UE 101 uses CANCEL to close existing SIP sessions if an IMS PDN exists on a legacy network. The UE 101 clears SIP sessions locally if there are no IMS PDN sessions in existence. After the SIP sessions are cleared by the UE 101, the continuation module 220 continues the voice call through the CSFB procedure in step 510.

In step 512, after the ESR is triggered in the ESR failure scenario when the ESR not received, based on a T3417 ext Timer expiry in step 514, the UE 101 uses CANCEL to close an existing SIP session if the IMS PDN exists on a legacy network in step 516. The UE 101 clears the SIP session locally in there is no IMS PDN in existence. In step 518, the voice call is continued through CSFB.

Figure 6:
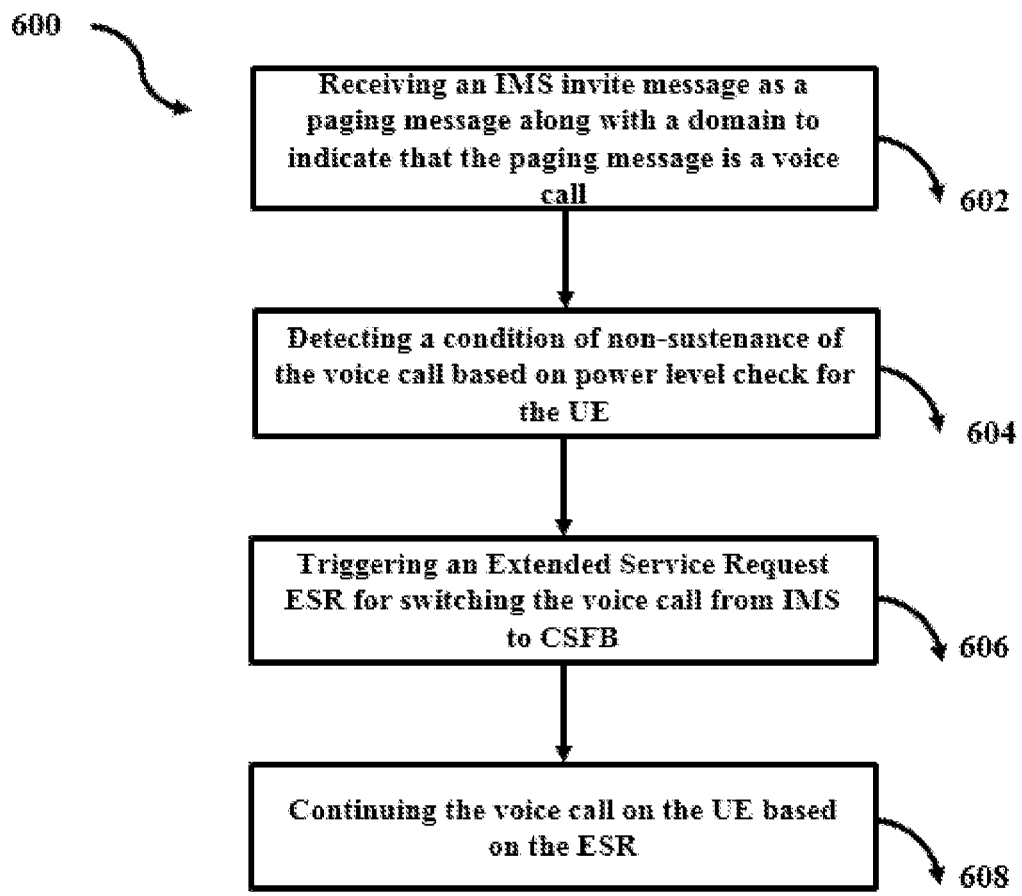
FIG. 6 illustrates a flow chart of a method for configuring a UE for preventing a voice call drop based on a paging type, according to embodiments of the present disclosure.

FIG. 6 illustrates a flow chart of a method for configuring a UE for preventing a voice call drop based on a paging type, according to embodiments of the present disclosure. The method 400 may be performed by the UE 101.

In step 602, the UE 101 receives a paging message as an IMS invite message associated with a new domain to indicate that the paging message is a voice call. The reception module 212 of the UE 101 may receive the IMS invite message.

In step 604, the UE 101 detects a condition of non-sustenance of the voice call based on a power level check of the UE. The signal detection module 216 of the UE 101 may detect the condition of non-sustenance.

In step 606, the UE 101 triggers an ESR for switching the voice call from the IMS to CSFB based on the detection of non-sustenance. The trigger module 218 of the UE 101 may trigger the ESR for switching the voice call.

In step 608, the UE 101 continues the voice call, on the UE, based on the ESR. In an embodiment, the continuation module 220 continues the voice call.

Figure 7:
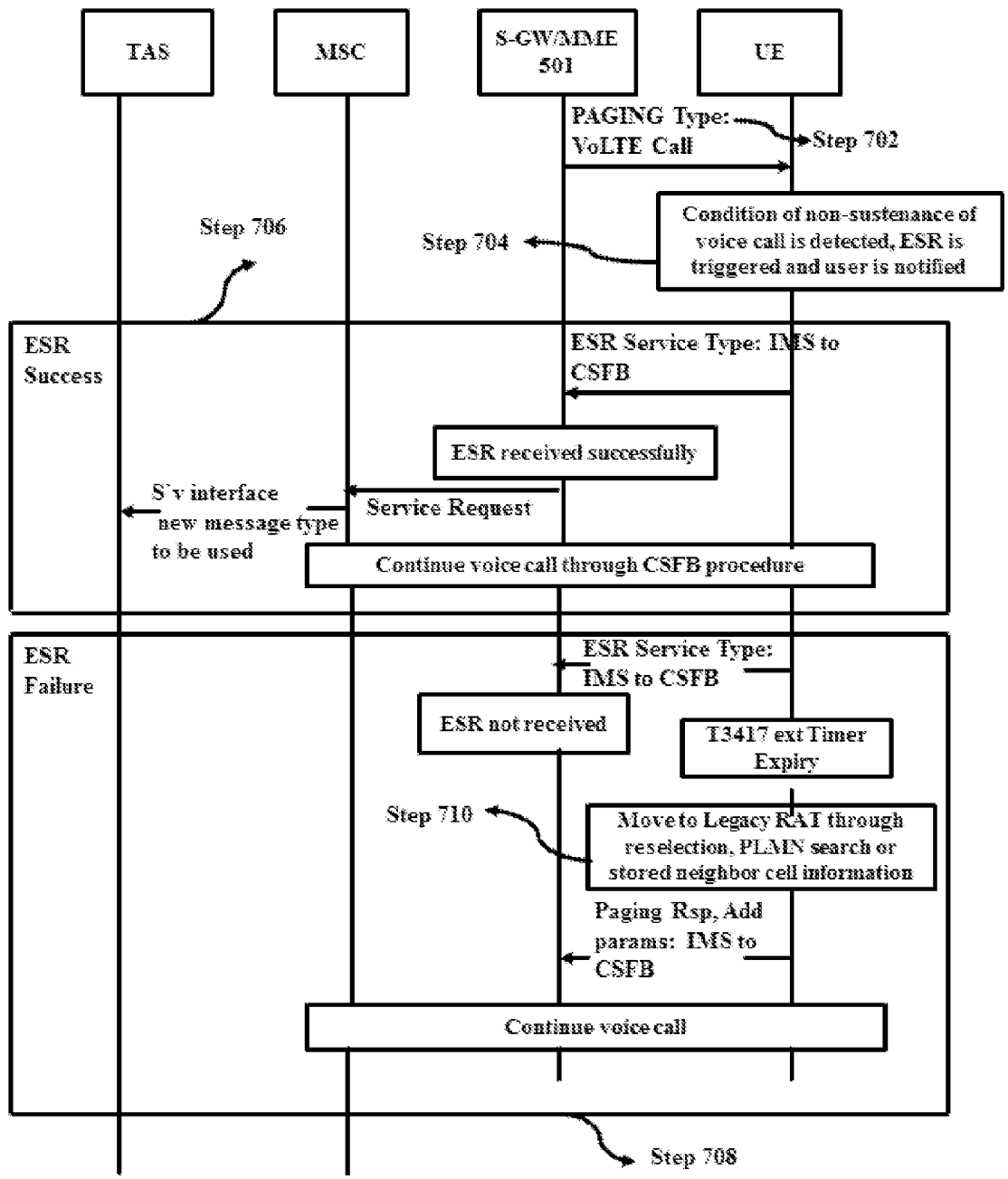
FIG. 7 illustrates a method for preventing a voice call drop in a UE based on Paging Type, according to embodiments of the present disclosure.

FIG. 7 illustrates a method for preventing a voice call drop in a UE based on paging type, according to embodiments of the present disclosure.

The UE 101 in FIG. 7 includes paging type. In step 702, the UE 101 receives a paging message with a domain identifying the paging type as the voice call. The identification with the domain prevents the UE 101 from having to connect with the network for identification of the IMS invite message.

In step 704, the condition of non-sustenance is detected and the ESR is triggered, without the user being notified.

In step 706, after the ESR is triggered in the ESR success scenario when the ESR is received, the UE 101 continues the voice call through CSFB procedure.

In step 708, after the ESR is triggered in the ESR failure scenario when the ESR not received, the voice call is continued through CSFB based on T3417 ext Timer expiry.

Figure 8:
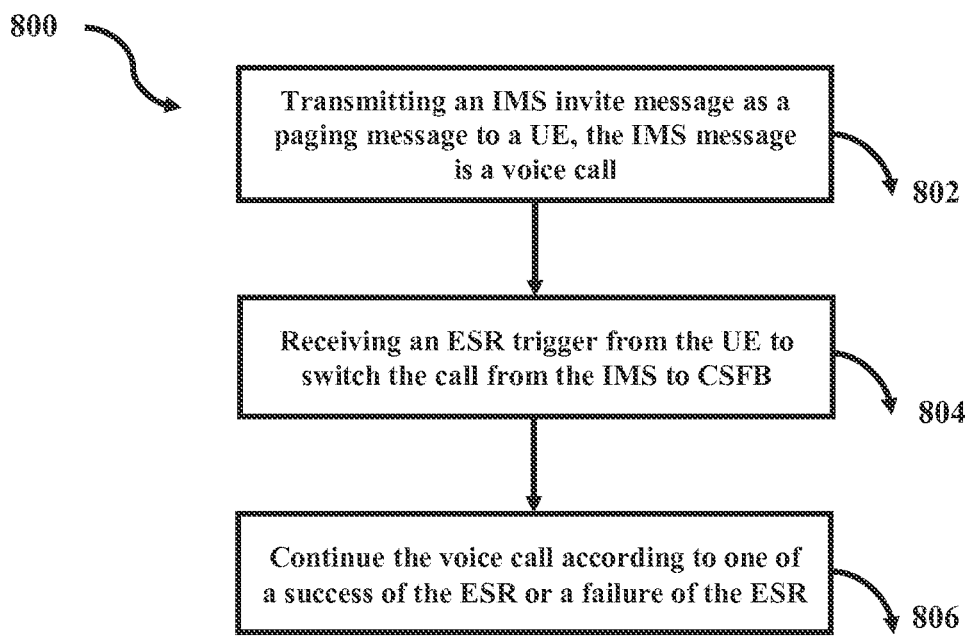
FIG. 8 illustrates a flow chart of a method for preventing a voice call drop in a UE, according to embodiments of the present disclosure.

Referring now to FIG. 8, which illustrates a flow chart of a method for preventing a voice call drop in a UE according to embodiments of the present disclosure, the method 800 may be performed by the system 300.

In step 802, the system 300 transmits an IMS invite message as a paging message for a voice call from a network. The transmission module 310 of the system 300 may transmit the IMS invite message to the UE 101.

In step 804, the system 300 receives, from the UE 101, an ESR trigger associated with a message to switch the voice call from the IMS to CSFB. The ESR trigger is received when the UE is detected with a condition of non-sustenance of the voice call. The reception module 312 of the system 300 may receive the trigger.

In step 806, the system 300 continues the voice call on the UE according to one of a success and a failure of the ESR.

The various actions and steps in the method 800 may be performed in the order presented or in a different order.

Referring back to FIGS. 5a and 5b, after the IMS invite is transmitted to the UE 101, in the ESR success scenario when the ESR is received, the termination module 316 closes the transaction based on no response being received from the UE 101 for the IMS invite. In step 522, SIP cancel may be used when the CAS receives 100 trying from the UE 101. In step 524, based on indication to switch from IMS to CSFB, the information received from the MME/MSC may apply CSFB logic and wait for response from the UE 101 for the paging message as transmitted for identifying the legacy network. In step 510, the voice call is continued through the CSFB procedure.

In FIG. 5b, when the ESR failure scenario is detected in step 512, the system 300 moves to the Legacy RAT through reselection, a PLMN search or stored neighbor cell information in step 526. In step 528, SIP cancel may be used when TAS receives a 100 trying notification from the UE 101. After the SIP cancel is used, the system 300 continues the call on the UE 101 in step 518.

Alternatively, the system 300 may transmit the IMS invite message as the paging message with the domain identifying the IMS message as the voice call without establishing connection with the network.

Referring back to FIG. 7, the system 300 moves to the legacy RAT through resection, PLMN search or stored neighbor cell information in step 710, and continues the voice call at the UE 101 in step 708.

Figure 9:
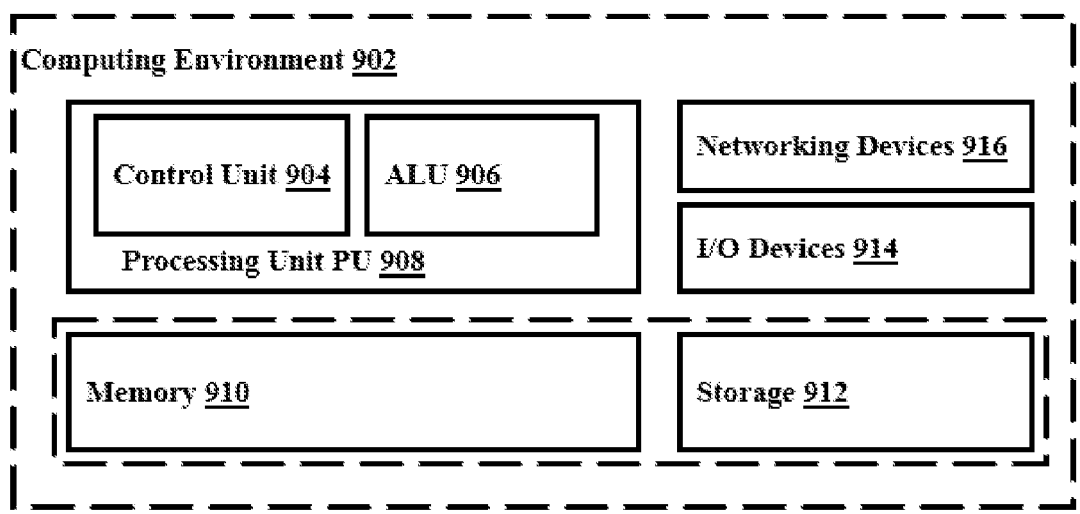
FIG. 9 illustrates a computing environment implementing the method, system and UE for preventing a voice call drop in a communication network, in accordance to an embodiment of the present disclosure.

FIG. 9 illustrates a computing environment implementing the method, system and UE for preventing a voice call drop in a communication network, in accordance with an embodiment of the present disclosure. In FIG. 9, the computing environment 902 comprises at least one processor 908 that is equipped with a control unit 904 and an Arithmetic Logic Unit (ALU) 906, a memory 910, a storage 912, plurality of networking devices 916 and a plurality of I/O devices 914. The processor 908 is responsible for processing the instructions of the algorithm performed by the computing environment 902. The processor 908 receives commands from the control unit 904 in order to perform the processing. Any logical and arithmetic operations involved in the execution of the instructions are computed by the ALU 906.

The computing environment 902 may be composed of multiple homogeneous and/or heterogeneous cores, multiple CPUs of different types, special media and other accelerators. The plurality of processor 908 may be located on a single modem chip or on multiple modem chips.

The algorithm comprising instructions and codes required for the implementation are stored in at least one of the memory 910 and the storage 912. At the time of execution, the instructions may be fetched from the corresponding memory 910 and/or storage 912, and executed by the processor 908.

Various networking devices 916 or external I/O devices 914 may be connected to the computing environment to support various implementations through the networking unit and the I/O device unit.

The embodiments disclosed herein can be implemented through at least one software program running on at least one hardware device and performing network management functions to control the elements. The elements shown in FIGS. 5a, 5b and 7 include blocks which may be at least one of a hardware device, or a combination of a hardware device and software module.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method for configuring a User Equipment (UE) for preventing voice call drops, the method comprising:
   receiving a paging message including information indicating a domain for a voice call, as an Internet Protocol Multimedia Subsystem (IMS) invite message from a network;
   establishing a connection with the network to determine whether the IMS invite message is for the voice call;
   detecting a condition of non-sustenance of the voice call in an IMS service type, based on power levels of a serving cell and a neighbor cell on which the UE is registered, wherein the power levels are checked by the UE while the voice call in the IMS service type is established;
   triggering an Extended Service Request (ESR) for switching the voice call from the IMS to Circuit Switched Fallback (CSFB) based on the non-sustenance detection; and
   continuing the voice call, on the UE, based on the ESR.

2. The method as claimed in claim 1, wherein switching the voice call includes changing a service type from the IMS service type to a CSFB service type.

3. The method as claimed in claim 1, wherein the voice call is continued on the UE according to a success of the ESR or a failure of the ESR.

4. The method as claimed in claim 1, wherein continuing the voice call comprises terminating reception of IMS signal procedures and continuing the voice call in a Circuit Switched (CS) domain on a legacy network.

5. The method as claimed in claim 1, wherein the domain includes a paging type indicating an IMS call.

6. A User Equipment (UE) for preventing voice call drops, the UE comprising:
   a chip set;
   a memory coupled to the chip set, wherein the memory stores a plurality of modules executed by the chip set, and wherein the plurality of modules comprises:

a reception module configured to receive a paging message as an Internet Protocol Multimedia Subsystem (IMS) invite message from a network;
a connection establishment module configured to establish a connection with the network to determine whether the IMS invite message is for a voice call;
a detection module configured to detect a condition of non-sustenance of the voice call in an IMS service type, based on power levels of a serving cell and a neighbor cell on which the UE is registered, wherein the power levels are checked while the voice call in the IMS service type is established;
a trigger module configured to trigger an Extended Service Request (ESR) for switching the voice call from the IMS to Circuit Switched Fallback (CSFB) if the power levels of the serving cell and the neighbor cell checked by the detection module are in the condition of non-sustenance of the voice call in the IMS service type; and
a continuation module configured to continue the voice call, on the UE, based on the ESR.

7. The UE as claimed in claim 6, wherein switching the voice call includes changing a service type from the IMS service type to a CSFB service type.

8. The UE as claimed in claim 6, wherein the continuation module is further configured to continue the voice call according to a success of the ESR or a failure of the ESR.

9. The UE as claimed in claim 6, wherein the continuation module is further configured to terminate reception of IMS signal procedures and continues the voice call in a Circuit Switched (CS) domain on a legacy network.

10. The UE as claimed in claim 6, wherein the paging message including information indicating a domain for the voice call.

11. The UE as claimed in claim 10, wherein the domain includes a paging type indicating an IMS call.

12. A chip set, comprising:
a processor;
a memory coupled to a processor, wherein the memory stores a plurality of modules executed by the processor, and wherein the plurality of modules comprises:
a reception module configured to receive a paging message including information indicating a domain for a voice call, as an Internet Protocol Multimedia Subsystem (IMS) invite message from a network;
a connection establishment module configured to establish a connection with the network to determine whether the IMS invite message is for the voice call;
a detection module configured to detect a condition of non-sustenance of the voice call in an IMS service type, based on power levels of a serving cell and a neighbor cell on which the UE is registered, wherein the power levels are checked while the voice call in the IMS service type is established;
a trigger module configured to trigger an Extended Service Request (ESR) for switching the voice call from the IMS to Circuit Switched Fallback (CSFB) if the power levels of the serving cell and the neighbor cell checked by the detection module are in the condition of non-sustenance of the voice call in the IMS service type; and
a continuation module configured to continue the voice call, on the UE, based on the ESR.

13. The chip set as claimed in claim 12, wherein switching the voice call includes changing a service type from the IMS service type to a CSFB service type.

14. The chip set as claimed in claim 13, wherein the continuation module is further configured to continue the voice call according to a success of the ESR or a failure of the ESR.

15. The chip set as claimed in claim 12, wherein the continuation module is further configured to terminate reception of IMS signal procedures and continues the voice call in a Circuit Switched (CS) domain on a legacy network.

16. The chip set as claimed in claim 12, wherein the domain includes a paging type indicating an IMS call.

* * * * *